United States Patent Office 2,926,772
Patented Mar. 1, 1960

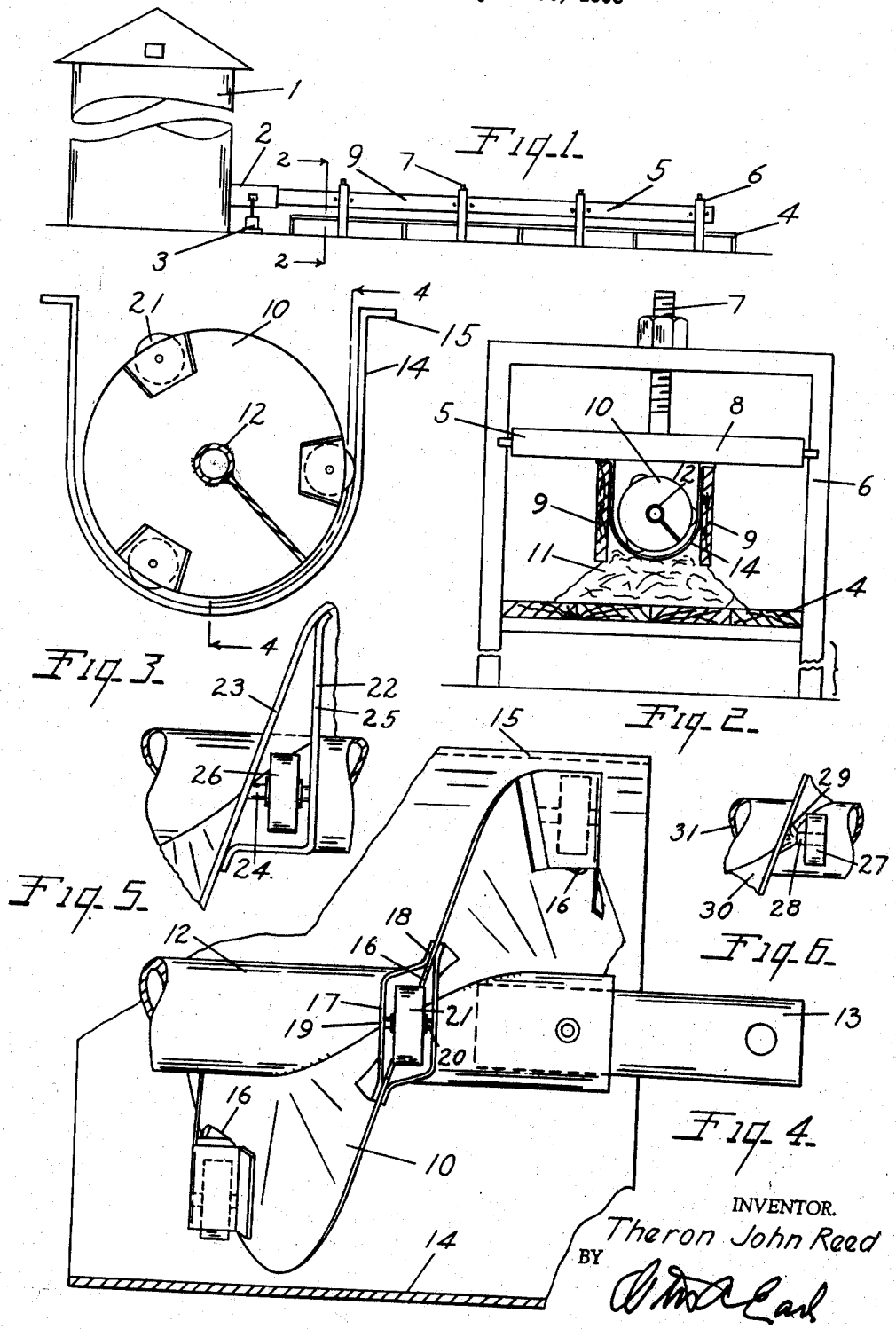

2,926,772

BEARING SUPPORT FOR HELICAL FEED SCREWS

Theron John Reed, Burr Oak, Mich.

Application April 14, 1958, Serial No. 728,306

3 Claims. (Cl. 198—213)

This invention relates to improvements in bearing support for helical feed screws. The principal objects of this invention are:

First, to provide a bearing support for helical feed screws which offers a minimum resistance to movement of material by the screw.

Second, to provide a bearing support for feed screws which can be mounted intermediate the ends of the feed screw without requiring a fixed transverse obstruction across the conveyor way in which the screw is operating.

Third, to provide a feed conveyor for bulk material such as ensilage and animal fodder which can operate at relatively low speeds and extend over substantial distances due to decreased resistance to delivery of the feed by the screw.

Fourth, to provide a feed conveyor for animal feed distributors which can be operated with a minimum of power.

Other objects and advantages of the invention will be apparent from a consideration of the following description and claims. The drawings, of which there is one sheet, illustrate a highly practical form of the invention.

Fig. 1 is a fragmentary elevational view of an animal feeding system including a storage silo and feeding rack with the distributing conveyor of the invention associated therewith.

Fig. 2 is a fragmentary transverse cross sectional view taken along the plane of the line 2—2 in Fig. 1.

Fig. 3 is an enlarged fragmentary cross sectional view through the screw conveyor shown in Fig. 2.

Fig. 4 is an enlarged fragmentary longitudinal cross sectional view taken along the plane of the line 4—4 in Fig. 3 and illustrating the conveyor screw in elevation.

Fig. 5 is a fragmentary elevational view of a modified form of the conveyor screw.

Fig. 6 is a fragmentary elevational view of a further modified form of bearing mounting.

It is now a common practice in the feeding of cattle to store ensilage or other feed in bulk quantities and to distribute the feed by means of a conveyor to an elongated elevated feeding platform so that a number of the cattle can feed at one time. Fig. 1 illustrates conventionally such a cattle feeding set-up in which the silo 1 functions to store the feed and a delivery conveyor 2 driven by a motor 3 draws feed from the silo as desired. The elongated feeding platform is indicated at 4 and a distributing conveyor 5 is supported over the platform by a plurality of supports 6. The distributing conveyor receives material directly from and is conveniently driven by the delivery conveyor 2. As appears in greater detail in Fig. 2 the supports 6 are bridge-like frames which straddle the feeding platform 4 and have screws 7 vertically adjustably mounted in their upper cross pieces. The screws 7 support hangers 8 on which the novel bearings of the invention are mounted. The hangers 8 also support longitudinally extending side boards 9 which form the sides of the distributing conveyor way. A helical distributor screw 10 rotatably mounted between the side boards distributes the feed from the delivery conveyor with the bulk feed material flowing downwardly and outwardly under the side boards 9 as indicated at 11.

As appears more clearly from Figs. 2, 3 and 4, the helical screw 10 consists of a spirally twisted plate secured as by welding at intervals to a central shaft 12. The screw and the plate may be conveniently made up in longitudinal sections as shown in Fig. 4 in which case one end of each shaft section 12 has a projecting pin or stud 13 adapted to fit into a succeeding shaft section. In order to rotatably support and fixedly locate the elongated feed screw each hanger 8 supports a U-shaped bearing 14. The bearing is of substantial length preferably somewhat longer than the pitch of the helical screw plate 10. At its upper edges the bearing 14 is provided with laterally outturned flanges 15 by means of which the bearing is attached to its hanger 8. The sides of the U-shaped bearing may also support side boards 9.

Within the U-shaped bearing 14 the helical screw plate 10 is shaped or cut to provide three or more notches 16 in its periphery with the notches arranged at angularly and axially spaced positions along the helix. The notches are covered on the face of the helix by opposed deflector plates 17 having marginal flanges 18 that can be secured as by bolting or welding to the screw plate around the edges of the notches. The deflector plates 17 are shaped so as to provide longitudinally space side walls 19 perpendicular to the axis of the shaft 12. The side walls 19 support short shafts 20 that are parallel to the shaft 12 but spaced radially therefrom. Rotatably mounted on the short shafts 20 are rollers 21 which have their peripheries projecting slightly beyond the periphery of the helix to rollingly engage the inside of the U-shaped bearing 14. The rollers 21 thus provide anti-friction rolling engagement between the feed screw and the bearing and support and locate the helix and the conveyor shaft in longitudinal alignment. The deflector plates 17 offer little resistance to the flow of material being conveyed by the screw plate and in fact act as jaws or pushers to pick up and force the material along the screw. At the same time the deflector plates prevent the material being conveyed from becoming entangled with the rollers 21 and their supporting shafts 20.

It has been found that a screw conveyor supported by this type of bearing requires less power than a conveyor of comparable size supported by a fixed strut and and journal bearing. It has also been found that a conveyor with this new bearing may be operated at slower speed without reduction in flow of material due to reduced resistance of travel of material along the screw.

Fig. 5 illustrates a modified form of the roller mounting on the helical screw. In this modification a single deflector plate 22 is mounted entirely on one side of the screw plate 23 and the roller shaft 24 is fixedly supported between the side wall 25 of the deflector plate and the opposed portion of the screw plate itself. The roller 26 mounted on the shaft functions as in the first form of the invention to support the conveyor screw and shaft from a U-shaped bearing. It will be appreciated that the roller 26 is duplicated at spaced positions along the plate 23.

The bearing support for the screw conveyor disclosed is not limited to use in open trough conveyors as obviously the longitudinal length of the screw plate could be enclosed in a tube with the supporting rollers engaging the cylindrical inner surface of the tube. The deflector plates 19 and 25 are not absolutely essential particularly if the material being conveyed is of a fine character which would not clog the bearing of the rollers 26. In this latter instance the short bearing shafts can be secured to the helical plate and have the rollers mounted openly thereon.

Fig. 6 illustrates a modified form of the bearing in which the rollers 27 are mounted in the open on stub shafts 28. The shafts 28 are secured as by welding at 29 to project at an angle from the screw plate 30 but parallel to the shaft 31. The rollers are of course duplicated as needed.

Having thus described the invention, what is claimed as new and desired to secure by Letters Patent is:

1. A distributing conveyor for ensilage and the like in combination with a feeding platform and a bulk source of the ensilage comprising supports positioned and spaced at intervals along said platform, hangers vertically adjustably carried by said supports over said platform, U-shaped bearings having semi-cylindrical lower portions supported from said hangers, a sectional shaft extending longitudinally through said bearings and having a sectional helical screw plate projecting therefrom, said helical plate being of a radius smaller than the radius of said bearing, said helical plate having notches cut in its periphery at angularly and axially spaced portions therearound and located between the ends of said bearings, deflector plates secured to the opposite sides of said screw plate around said notches and forming cupped recesses opening radially outwardly of the helix, shafts supported by said deflector plates in radially spaced relation to said first shaft and parallel thereto, and rollers rotatably mounted on said radially spaced shafts with the peripheries of the rollers projecting beyond the periphery of the screw plate whereby the rollers engage the semi-cylindrical surfaces of said bearings and rotatably support said screw plate and said first shaft therein.

2. In combination with a feed screw for bulk material, a bearing support comprising a supporting surface extending arcuately around the lower side of said screw for at least a portion of the length of the screw, said screw having notches formed in its periphery at angularly and axially spaced portions therealong and located between the ends of said supporting surface, deflector plates secured to the sides of said screw and bridging said notches to define recesses opening radially outwardly from the screw, shafts supported by said deflector plates and extending through said notches parallel to the axis of said screw, and rollers rotatably mounted on said shafts with the peripheries of the rollers projecting radially beyond the periphery of said screw and supportingly engageable with said surface upon rotation of said screw.

3. In combination with a feed screw for bulk material, a bearing support comprising a supporting surface extending arcuately around the lower side of said screw for a portion of the length of the screw, said screw having notches formed in its periphery at angularly and axially spaced portions therealong and located between the ends of said supporting surface, plates secured to the sides of said screw and bridging said notches, shafts supported by said plates and extending through said notches parallel to the axis of said screw, and rollers rotatably mounted on said shafts with the peripheries of the rollers projecting radially beyond the periphery of said screw and supportingly engageable with said surface upon rotation of said screw.

References Cited in the file of this patent

UNITED STATES PATENTS 2,009,734     Hiller et al.             July 30, 1935

FOREIGN PATENTS 367,116     Germany               Jan. 17, 1923